United States Patent
Yao et al.

(10) Patent No.: US 11,397,668 B2
(45) Date of Patent: Jul. 26, 2022

(54) DATA READ/WRITE METHOD AND APPARATUS, AND STORAGE SERVER

(71) Applicant: Huawei Technologies Co., Ltd., Shenzhen (CN)

(72) Inventors: Tangren Yao, Shenzhen (CN); Chen Wang, Shanghai (CN); Feng Wang, Chengdu (CN); Wei Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/856,257

(22) Filed: Apr. 23, 2020

(65) Prior Publication Data

US 2020/0250080 A1    Aug. 6, 2020

Related U.S. Application Data

(63) Continuation of application No. PCT/CN2018/071637, filed on Jan. 5, 2018.

(51) Int. Cl.
*G06F 12/02* (2006.01)
(52) U.S. Cl.
CPC .................. *G06F 12/023* (2013.01)
(58) Field of Classification Search
CPC .................................................. G06F 12/023
USPC .......................................................... 711/203
See application file for complete search history.

(56) References Cited

U.S. PATENT DOCUMENTS

| | | | |
|---|---|---|---|
| 8,583,852 B1 | 11/2013 | Mahajan et al. | |
| 2008/0162585 A1* | 7/2008 | Takahashi | G06F 16/2272 |
| 2009/0204665 A1* | 8/2009 | Prall | H04L 12/4013 |
| | | | 709/203 |
| 2009/0307249 A1* | 12/2009 | Koifman | G06F 3/0659 |
| 2011/0029524 A1* | 2/2011 | Baptist | G06F 11/1076 |
| | | | 707/737 |
| 2011/0058526 A1 | 3/2011 | Seo et al. | |
| 2012/0136973 A1 | 5/2012 | Lassen et al. | |
| 2012/0159099 A1 | 6/2012 | Lindamood et al. | |
| 2013/0138862 A1* | 5/2013 | Motwani | H04L 9/0825 |
| | | | 711/5 |
| 2013/0304746 A1* | 11/2013 | Dhuse | G06F 11/1096 |
| | | | 707/743 |

(Continued)

FOREIGN PATENT DOCUMENTS

| | | |
|---|---|---|
| CN | 101911745 A | 12/2010 |
| CN | 102622412 A | 8/2012 |

(Continued)

*Primary Examiner* — William E. Baughman
(74) *Attorney, Agent, or Firm* — Conley Rose, P.C.

(57) ABSTRACT

In a data read/write method, a storage server receives a write request of a client and performs storage. Each write request carries a to-be-written slice, an ID of a first storage device, and a virtual storage address of a first virtual storage block. If storage is performed continuously successfully from a start address within virtual storage space of a virtual storage block in the storage device, a successful continuous storage address range is recorded. For each storage device, all data within the successful continuous storage address range is successfully stored data. When receiving a read request of a client for an address segment within the address range, the storage server may directly return data that needs to be read to the client.

24 Claims, 4 Drawing Sheets

(56) References Cited

U.S. PATENT DOCUMENTS

| | | | |
|---|---|---|---|
| 2014/0026017 A1* | 1/2014 | Grube | G06F 16/182 |
| | | | 714/770 |
| 2014/0122636 A1* | 5/2014 | Peake | H04L 67/1097 |
| | | | 709/213 |
| 2014/0237159 A9* | 8/2014 | Flynn | G06F 11/1471 |
| | | | 711/102 |
| 2014/0330921 A1* | 11/2014 | Storm | G06F 11/1469 |
| | | | 709/213 |
| 2014/0344617 A1* | 11/2014 | Resch | G06F 3/067 |
| | | | 714/6.31 |
| 2015/0039827 A1 | 2/2015 | Kazi | |
| 2015/0067421 A1* | 3/2015 | Baptist | G06F 16/13 |
| | | | 714/723 |
| 2016/0357440 A1 | 12/2016 | Wang et al. | |
| 2019/0171537 A1 | 6/2019 | Wang et al. | |

FOREIGN PATENT DOCUMENTS

| | | |
|---|---|---|
| CN | 103064765 A | 4/2013 |
| CN | 103593147 A | 2/2014 |
| CN | 105100146 A | 11/2015 |
| CN | 105468718 A | 4/2016 |
| CN | 105630808 A | 6/2016 |
| CN | 106302702 A | 1/2017 |
| CN | 107273048 A | 10/2017 |
| EP | 3220275 A1 | 9/2017 |
| WO | 2015077955 A1 | 6/2015 |

\* cited by examiner

DATA READ/WRITE METHOD AND APPARATUS, AND STORAGE SERVER

CROSS-REFERENCE TO RELATED APPLICATIONS

This is a continuation of Int'l Patent App. No. PCT/CN2018/071637 filed on Jan. 5, 2018, which claims priority to Int'l Patent App. No. PCT/CN2017/107695 filed on Oct. 25, 2017, which are incorporated by reference.

TECHNICAL FIELD

This disclosure relates to the storage field, and in particular, to the distributed storage field.

BACKGROUND

In a distributed storage system, to reduce a data loss probability, data is protected by using a redundancy policy such as a multi-copy policy or an erasure code (EC) policy. When data is stored by using these redundancy policies, a system has a requirement for strong consistency of data. Specifics are as follows: A client writes data to a distributed storage system. In a multi-copy storage system, only after all copies are successfully stored, the client considers that multiple copies are successfully stored in the distributed storage system. During EC storage, only when all strips are successfully stored, the client considers that the data is successfully stored in the distributed storage system. This manner helps ensure strong consistency of data. However, if any node temporarily does not write successfully, latency and performance of data storage of the client are affected.

In a scenario of a large-scale storage cluster, this problem is severer. Particularly, if storage servers in the distributed storage system are distributed in a scenario of multiple data centers or multiple available zones, a probability that networks between storage servers and between each storage server and the client are congested or a storage server is subject to subhealth increases greatly, and a few storage servers are vulnerable to problems. Consequently, data write performance of the distributed storage system obviously decreases, and latency is greatly increased.

SUMMARY

According to a first aspect, the disclosure provides a data read/write method, applied to a first storage server in a distributed storage system, where the distributed storage system includes multiple storage servers, each storage server includes at least one storage device, storage space of the distributed storage system is managed by using a virtual storage block, and each virtual storage block corresponds to multiple storage devices. The method includes: receiving, by the first storage server, a first write request, where the first write request includes a first slice of first target data, a first virtual storage address, and an identifier (ID) of a first storage device, the first virtual storage address is a relative location in a first virtual storage block, the first virtual storage address corresponds to a first logical block address of the first storage device, the first storage device is one of storage devices corresponding to the first virtual storage block, and the first storage device is managed by the first storage server; storing, by the first storage server, the first slice in the first storage device by using the first logical block address as a start address, where after storage is completed, a first successful continuous storage address range from a start address within which storage is performed continuously successfully is recorded; and receiving, by the first storage server, a first read request, where the first read request carries a first virtual storage address segment and the ID of the first storage device, and a logical block address corresponding to the first virtual storage address segment is located at the first storage device; and when the first virtual storage address segment falls within the first successful continuous storage address range, reading data of the first virtual storage address segment from the first storage device.

During application of the method, after receiving a write request of a client and successfully storing a slice in the write request to a storage device, a storage server records a successful continuous storage address range depending on a case. When the slice that is stored based on the method needs to be subsequently read, the slice may be directly read and returned to the client, and multiple slices do not need to be read for additional parity, thereby reducing impact of read amplification on a system resource.

In a first possible implementation of the first aspect, one or more slices are stored within the first successful continuous storage address range, and when multiple slices are stored, the stored slices are adjacent to each other.

In a second possible implementation of the first aspect, the first slice is a copy of the first target data; the first slice is an EC data strip of the first target data; or the first slice is an erasure code EC parity strip of the first target data. The first target data are divided to generate at least two EC data strips, and at least one EC parity strip is generated based on an EC algorithm by using multiple EC data slices.

Therefore, this embodiment supports both a distributed storage system using multi-copy and a distributed storage system using an EC.

In a third possible implementation of the first aspect, the first successful continuous storage address range is described in a form of a virtual storage address range of the first virtual storage block, or the first successful continuous storage address range is recorded in a form of a logical block address range of the first storage device.

The first successful continuous storage address range is a virtual address range as long as the first successful continuous storage address range can describe an address range within which slices are successfully stored continuously from a start address of the first virtual storage block, and description manners may be diversified. In another implementation method, alternatively, an LBA address corresponding to the virtual address may be used for description.

In a fourth possible implementation of the first aspect, each of the slices is a copy of the first target data. The client copies the first target data to generate at least two copies, or a storage server in the distributed storage system may copy the first target data to generate at least two copies.

In a fifth possible implementation of the first aspect, the method further includes: receiving, by the first storage server, a second read request, where the second read request carries a second virtual storage address segment and the ID of the first storage device, and detecting, by the first storage server, that the second virtual storage address segment does not fall within the first successful continuous storage address range; sending, by the first storage server, a failure response message to a client server; after receiving the failure response message, sending, by the client server, a third read request to a second storage server in the distributed storage system, where the third read request carries the second virtual storage address segment and an ID of a second storage device, the second storage device is different from the first storage device, and the first storage device and the second storage device correspond to the first virtual storage block; and when the second virtual storage address segment falls within a second successful continuous storage address range of the second storage server, reading, by the second storage server, data of the second virtual storage address segment from the second storage device and returning the data to the client server, where the second successful continuous storage address range indicates that, within a virtual storage address range of the first virtual storage block in the second storage device, slices are continuously stored from the start address of the first virtual storage block to the end address of the first slice.

In a fifth possible implementation of the first aspect, the slice may be a copy. As can be learned, in a multi-copy scenario, if data requested by the second read request is not read from a storage device, a next storage device may be selected from storage devices corresponding to the first virtual storage block, to continue to try to read the data, and reading is sequentially performed cyclically, until the data requested by the second read request is read.

In a sixth possible implementation of the first aspect, before the receiving, by the first storage server, a first write request, the method further includes: generating, by a client server, multiple slices of the first target data, selecting the first virtual storage block used to store the first target data, and sending multiple write requests including the first write request to a storage server in which a storage device corresponding to the first virtual storage block is located, where each write request includes one of the slices and a corresponding virtual storage address.

Client software is installed in the client server. In this embodiment, the entire storage method for the first target data is described.

Based on the sixth possible implementation of the first aspect, in a seventh possible implementation of the first aspect, after the client server receives a preset quantity of success response s, the first target data is successfully stored in the distributed storage system, and the total preset quantity of success response s is less than a total quantity of the multiple write requests.

In this embodiment, not all write requests need to be written successfully as long as a preset quantity of write requests is written successfully. In this embodiment, a slow node is allowed.

In a seventh possible implementation of the first aspect, the distributed storage system performs distributed system storage through not-in-place write. Therefore, for multiple slices sequentially written to a same first logical storage unit, the client server provides continuous addresses to the slices.

According to a second aspect, the disclosure further provides a data storage apparatus that can execute the first aspect and the possible implementations of the first aspect. The data storage apparatus may be a first storage server as hardware, or software code running in a first storage server.

According to a third aspect, the disclosure further provides a first storage server that can execute the first aspect and the possible implementations of the first aspect.

According to a fourth aspect, the disclosure further provides a data storage method for a distributed storage system. The distributed storage system includes multiple storage servers, each storage server includes at least one storage device, storage space of the distributed storage system is managed by using a virtual storage block, and each virtual storage block corresponds to multiple storage devices. The method includes: generating, a client server, multiple slices of first target data, selecting a first virtual storage block used to store the first target data, and generating multiple write requests, where each write request carries a slice, a virtual storage address, and a device address, the virtual storage address is a relative location in the first virtual storage block, each virtual storage address corresponds to a logical block address of a storage device, the device address is used to identify a storage device in a storage server, the storage device identified by the device address corresponds to the first virtual storage block, and device addresses in all write requests are different (in a case of multi-copy, slices are the same and are a copy of the first target data; in a case of an EC, slices are different, and a slice is a data slice or a parity slice in the first target data); and sending, by the client server, the multiple write requests to multiple storage servers, where the storage servers receiving the write requests obtain the slices, virtual storage addresses, and device addresses carried in the write requests, find corresponding storage devices according to the device addresses, and store the slices in the write requests according to logical block addresses (LBAs) corresponding to the virtual storage addresses in the write requests. Each storage device records a successful continuous storage range of the storage server in each virtual storage block. If a slice carried in a current write request is stored successfully, and slices carried in all write requests that are received by the storage device for the first virtual storage block before the current write request are stored successfully, the storage server in which the storage device is located records the first successful continuous storage address range that is from a start address of the first virtual storage block in the first storage device and within which storage is performed continuously successfully.

In the embodiment provided in the fourth aspect, the entire process of writing the first target data to the distributed storage system is described.

BRIEF DESCRIPTION OF DRAWINGS

To describe the technical solutions of the embodiments more clearly, the following briefly describes the accompanying drawings for describing the embodiments. The accompanying drawings in the following description show some embodiments of the disclosure, and other drawings may be derived from these accompanying drawings.

DESCRIPTION OF EMBODIMENTS

The following clearly describes the technical solutions with reference to the accompanying drawings in the embodiments. The embodiments are merely some but not all of the embodiments. All other embodiments obtained based on the embodiments described shall fall within the protection scope of the disclosure.

The embodiments are applicable to a storage manner of "not-in-place write," and the storage manner of not-in-place write is, for example, log-structure or append only. In addition, redirect-on-write (ROW) is also a not-in-place write scenario, and therefore is also applicable. In the not-in-place write scenario, idle storage space is allocated to newly written data. Therefore, the newly written data does not occupy storage space of existing data. In the not-in-place write scenario, storage space allocated to continuous write requests is also adjacent. Therefore, virtual storage locations of data carried in the continuous write requests are also adjacent in the storage system, and usually, the storage space of a next write request is after a storage location of a previous write request. If there is data that is not successfully written, storage space allocated to the data is reserved, and subsequently written data does not occupy the storage space allocated to the data that is not successfully written. After the data that is not successfully written is successfully recovered, the data obtained through recovery may be written to the storage space reserved for the data that is not successfully written. The embodiments are applicable to data read/write based on a distributed storage system, for example, a read/write manner based on multi-copy or a read/write manner of an EC.

For ease of description, data that needs to be written to the distributed storage system is referred to as first target data. The first target data is only used to indicate a piece of data and constitutes no other limitations, and the first target data may be a file, an object, a block, a part of a file, or a part of an object. The distributed storage system includes multiple storage servers, and the storage servers may be located in different data centers or different available zones (AZs).

Figure 1:
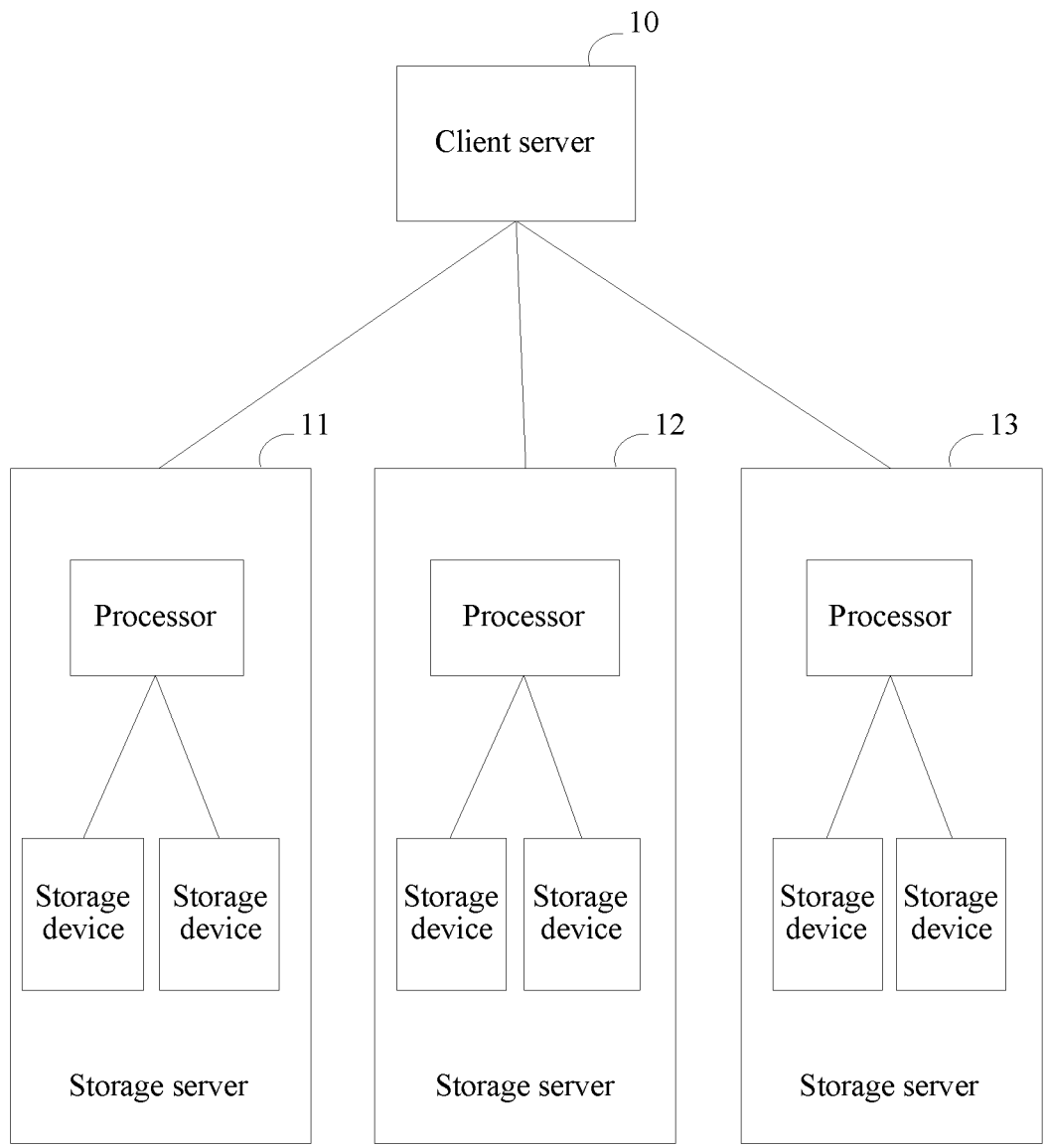
FIG. 1 is a topology view of an embodiment of a distributed storage system according to the disclosure.

Referring to FIG. 1, FIG. 1 is a topology view according to an embodiment of the disclosure. A storage server 11, a storage server 12, and a storage server 13 jointly form a distributed storage system, to provide a data read/write service for a client server 10. Each storage server includes a processor and at least one storage device, and the processor processes a read request and a write request of the client server and provides physical storage space. The storage device is a storage medium such as a hard disk, a solid-state drive (SSD), or a phase-change memory (PCM). The client server stores first target data in a storage device in the distributed storage system in a multi-copy manner or in an EC manner. A client program is installed in the client server 10, and the client program may be used by a user.

The storage server includes the processor and a memory, and may further have a built-in storage device or may be externally connected to a storage device. The memory stores program code, the processor may run the program code in the memory to perform an operation, and the storage device provides data storage space. The processor and the memory are independent from each other. In another embodiment, the storage server may alternatively have no memory, and is, for example, a field-programmable gate array (FPGA). This is equivalent to that the processor and the memory are integrated together. The storage server may be a computer, a general-purpose server, or a dedicated storage device, and a dedicated storage server includes a storage controller and a storage device. The storage device may permanently store data, and is, for example, a magnetic disk or a solid-state drive.

In the multi-copy storage manner, the client server performs a copy operation on the first target data that needs to be written, and then writes same data (copy) to different storage devices. The first target data and data generated by copying may be collectively referred to as copies; or the first target data may be referred to as a primary copy, and data generated by copying may be referred to as a copy (or a secondary copy). The former is used in the embodiments of this disclosure. A correspondence between a copy and a storage device used to store the copy in the distributed storage system is formed.

However, in the EC storage manner, the client server divides the first target data into N data strips, and then generates, based on an EC algorithm, M parity strips corresponding to the N data strips. The N+M strips jointly form one stripe. Each of the N+M strips corresponds to one storage device in the distributed storage system.

The two storage manners are both applicable to the embodiments. Therefore, for ease of description, either a copy or a strip is referred to as a slice unless otherwise described in the embodiments. In other words, a slice may be a copy in the multi-copy storage manner, or a strip (a data strip or a parity strip) in the EC storage manner.

One storage server may correspond to a maximum of one slice. This can improve reliability of the first target data. In some other cases, alternatively, one storage server may correspond to at least two slices. This implements centralized storage of the first target data.

During application of this embodiment, when the first target data is stored in the distributed storage system, if slices are continuously written successfully, a successful continuous write address range is recorded. It should be noted that, for a slice that is not successfully written, after the slice that is not successfully written is written successfully subsequently through data recovery or the like, an address range also becomes continuous, and therefore this is also considered as being written continuously successfully. Therefore, all data within the successful continuous write address range is successfully written data. In this case, when the client reads data, if a read address range carried in a read request falls within an address range of the slices that are written continuously successfully, it indicates that data to be read by using the read request is definitely successfully written data, an additional parity operation may not need to be performed, and the data is directly read and then returned to the client server. It is unnecessary to worry that the read data is wrong. Therefore, in this embodiment, when data is written, a slow node may be tolerated. To be specific, even if some slices are not written successfully, it may be considered that the first target data is successfully written to the distributed storage system as long as a quantity of successfully stored slices reaches a preset value. A write success response is returned to the client server. A storage device that temporarily does not successfully perform write is referred to as a slow node, and data that is not successfully written by the slow node may be recovered by using data of a storage node that successfully performs write.

Specifically, in the multi-copy storage manner, through application of the method described in this embodiment, as long as a preset quantity (1≤preset quantity≤total quantity of copies, for example, an optional manner of 1<preset quantity<total quantity of copies) of copies are successfully stored, it may be considered that the first target data is stored successfully. However, in some approaches, usually, only when all copies are stored successfully, it is considered that the first target data is successfully stored into the distributed storage system, and a write success response is returned to the client server, causing response latency.

Some approaches also include a multi-copy storage mechanism referred to as Quorum. The multi-copy storage mechanism may allow that, in the multi-copy storage manner, when not all copies are stored successfully, it is determined that target data is stored successfully in the distributed storage system. However, this Quorum mechanism has a requirement of W (a quantity of successfully written copies)+R (a quantity of successfully read copies)>N (a total quantity of copies). This indicates that, if a quantity of successfully written copies is smaller, more copies need to be read during copy read. Specifically, R copies need to be read during copy reading, and each copy carries a version number, to conveniently perform version comparison between the R copies to determine a copy of a latest version. This causes a problem of "read amplification". However, through application of this embodiment, it may be directly determined whether a copy of a latest version is successfully written to a storage device, a copy does not need to carry a version number, and version comparison does not need to be performed. Therefore, in this embodiment, usually, only one copy needs to be read, thereby better resolving the problem of read amplification.

A storage resource of the distributed storage system is provided by a storage device. For ease of management, the storage resource of the distributed storage system may be logically divided into multiple partitions. A storage resource of a partition comes from multiple storage devices (each storage device provides a part of storage space for the partition). Sizes of storage space provided by the storage devices may be the same.

A quantity of storage devices providing space for a partition may be less than a total quantity of storage devices in the distributed storage system. Each partition may be further divided into multiple extents, and each of storage devices related to the partition provides storage space of a same size for the extents. Extent management information describes information such as an extent size, a storage server in which an extent is located, and a storage device in which an extent is located. Therefore, if an extent is selected, a storage server corresponding to the extent and a storage device corresponding to the extent are determined, and a write request may be sent to the corresponding storage server. This embodiment does not exclude a case in which a storage resource is directly divided into extents instead of being divided into partitions.

The storage server manages storage space of a storage device by using a virtual storage unit, and the client server sends a slice to the virtual storage unit of the storage device of the storage server for storage. In the storage device, the virtual storage unit may be mapped to a physical address of the storage device.

Different extents may support different quantities of slices. For ease of understanding, an example is used herein: The distributed storage system has a total of ten storage devices, and three of the ten storage devices are related to a first partition. In this case, space of each extent of the first partition includes the three storage devices, and sizes of space provided by the storage devices for the extent are the same. The extent of the first partition may be used to store three slices (multi-copy storage of three copies, or EC storage of M+N=3). Assuming that there is a second partition and five storage devices may be related to the second partition, any extent of the second partition can support storage of five slices.

Figure 2:
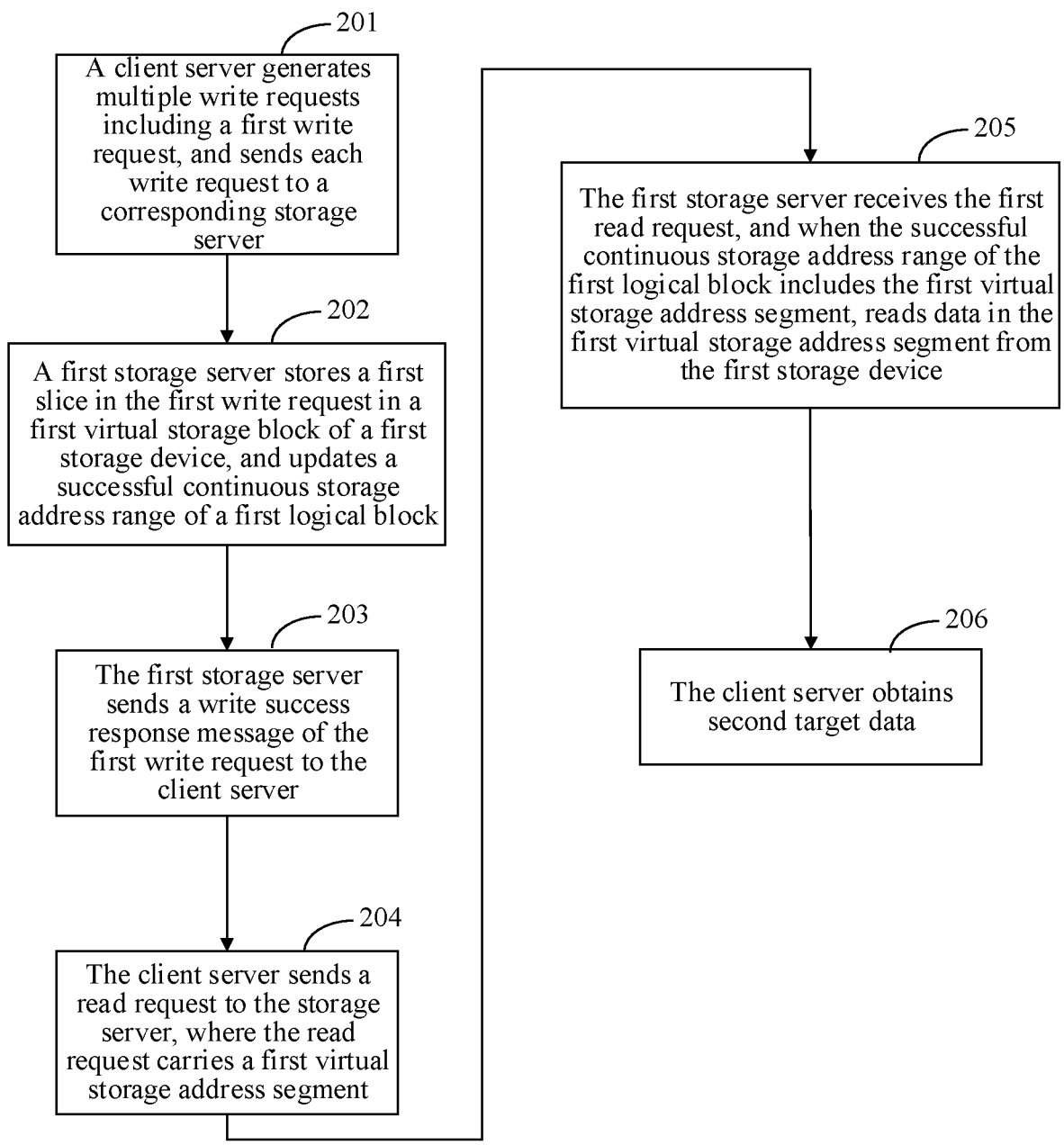
FIG. 2 is a flowchart of an embodiment of a data read/write method according to the disclosure.

An embodiment of a data read/write method in the disclosure is described below in detail with reference to FIG. 2.

201. A client server generates multiple slices based on first target data that needs to be stored, selects an extent used to store the slices, and sends a write request to a storage server in which the selected extent (referred to as a first extent) is located.

If the slices are copies in a multi-copy storage manner, the multiple slices are generated in the following manner: The first target data is copied to generate two or more copies. If the slices are strips in an EC storage manner, the multiple slices are generated in the following manner: The first target data is divided into N data strips, and then M parity strips are generated by using the N data strips.

The storage server in which the extent is located is a storage server providing storage space for the extent, and there is a correspondence between the extent and the storage server providing the storage space for the extent. The storage device in which the extent is located is a storage device providing storage space for the extent, and there is a correspondence between the extent and the storage device providing the storage space for the extent.

In the multi-copy storage manner, virtual storage addresses of write requests of different slices are the same, and a same virtual storage address corresponds to logical addresses of different storage devices. In the EC storage manner, virtual storage addresses of write requests of different slices are different, and each virtual storage address corresponds to a logical address of one storage device. A logical address corresponds to a physical address of a storage device, and the storage device may store data in the corresponding physical address according to the logical address.

The write request sent by the client server to the storage server includes: a device address, a slice, and a virtual storage address. The write request carries the device address in two manners: One is to directly add the device address to a field of the write request, and the other is to carry related information of the device address, where the storage server may obtain the device address after performing processing according to the related information of the device address.

The device address includes: server address+storage device ID, for example, the device address is server IP+storage device port number, and the storage device may be directly determined according to the storage device port number. The write request may alternatively not directly carry the device port number, and instead carry related information of the storage device, and then the storage server determines the corresponding storage device according to the related information of the storage device. For ease of description, information that is carried in a write request (or a read request) and that is used to determine a storage device is collectively referred to as a storage device ID.

The virtual storage address is a location in a virtual storage block, and may be indicated by "extent ID+start address" or "extent ID+start address+length". The extent ID is used for identifying an extent. In this embodiment, an extent used to write a slice is identified. The start address is a relative location in the extent and is a start address of storage space allocated by the client server to the slice. The information of length is optional. If at least two write requests are transmitted in a same data flow, the length may identify end locations of the write requests. This disclosure is based on the storage manner of not-in-place write. Therefore, in the extent indicated by the extent ID, an address before the start address is an allocated address. In this embodiment, the manner of not-in-place write is used. Therefore, virtual storage addresses allocated to slices are continuous. In other words, in a same extent, a virtual storage address currently allocated is adjacent to a virtual storage address previously allocated.

The following describes the device address and the virtual storage address by using a specific example. A device address of a write request is: IP address 211.133.44.13+port 32; and a virtual storage address of the write request is: extent 5+start address 100+slice length 50. A storage server address to which the write request is to be sent is 211.133.44.13, and a storage device to which the write request is to be sent is a storage device corresponding to the port 32 of the storage server of 211.133.44.13. A storage location indicated by the write request is: A slice having a length of 50 is written from a start address having an offset 100 in the extent 5.

Although there is more than one write request, processing processes of write requests are similar. A write request is used as an example below for specific description. The write request is referred to as a first write request, and a slice carried in the first write request is referred to as a first slice. Correspondingly, a device address included in the first write request is referred to as a first device address, the first device address belongs to a first storage device of a first storage server, the slice included in the first write request is referred to as the first slice, a virtual storage address included in the first write request is referred to as a first virtual storage address, and the first virtual storage address belongs to a first extent. The first device address is an address of a first device in the first storage server.

202. A first storage server receives a first write request from the client server, and stores a first slice in the first write request in a first virtual storage address of a first storage device. When the first slice is the 1st slice written to the first extent, a successful continuous storage address range is generated. A start address of the successful continuous storage address range is a start address of the first extent, and an end address of the successful continuous storage address range is an end address of the first slice in the first extent. When the first slice is written to the first extent but is not the 1st slice written to the first extent, and all slices (including the first slice) written to the first virtual storage block are all written successfully, the successful continuous storage address range of the first extent is updated. A start address of the updated successful continuous storage address range of the first extent is the start address of the first extent, and an end address of the updated successful continuous storage address range of the first extent is the end address of the first slice in the first extent. If the first slice is not successfully written, the successful continuous storage address range is not updated, and the successful continuous storage address range keeps unchanged.

Specifically, the first storage device stores the first slice to a storage medium corresponding to the first virtual storage address. The first storage device records a mapping relationship between a virtual storage address and a logical block address. The first storage server may convert the first virtual storage address into a first LBA based on the mapping relationship, and use the first LBA address as a start address for storing the first slice.

The storage server further stores the successful continuous storage address range from the start address of the first extent in the first storage device, and may store the successful continuous storage address range in the first storage device or another device as long as the successful continuous storage address range can be read by the first storage server.

The successful continuous storage address range of the first extent is an address range, of successfully continuously written slices from the start address, within an address range of the first extent in the first storage device. The successfully continuously written slices are adjacent, and an address to which no data is written does not exist.

Because the start address of the address range of the successfully written slices is always the start address of the extent, the address range of successfully written slices may be described by using only the end address of the address range of successfully written slices. The following describes the concept of the successful continuous storage address range in further detail with reference to FIG. 3. In other words, all slices within the successful continuous storage address range are written successfully, the slices are adjacent, and there is neither an idle address nor a write failure address.

It should be noted that, logical storage space of an extent is distributed in multiple storage devices. A successful continuous storage address range of an extent described in the embodiments is for a single storage device, and refers to that the logical storage space of the extent in a storage device successfully stores multiple slices (a slice that is not stored successfully does not exist) continuously. "Continuously" herein refers to that an end address of a slice is adjacent to a start address of a next slice. In other words, there is no hole between slices. The multiple storage devices corresponding to the first extent record the successful continuous storage address range of the first extent by using a same principle, and for conciseness, this embodiment is described by using only the first storage device as an example.

Figure 3:
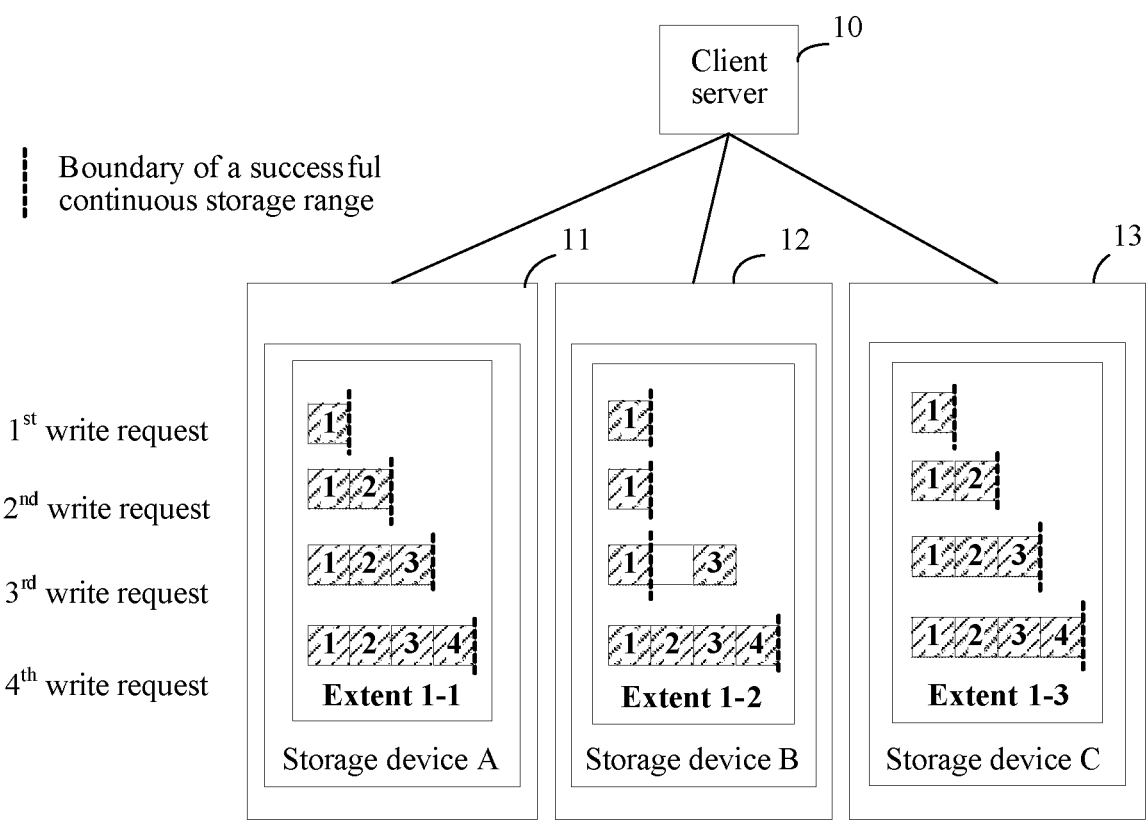
FIG. 3 is a diagram of multiple write requests according to an embodiment of the disclosure.

As shown in FIG. 3, a same extent (extent 1) performs a slice storage operation four times in total, and an operation object of each storage operation is three slices. The extent 1 corresponds to three storage devices, and logical storage space corresponding to the three storage devices is respectively an extent 1-1, an extent 1-2, and an extent 1-3.

It should be noted that, in the multi-copy storage manner, logical storage space corresponding to different storage devices of an extent may be described by using a same virtual address. For example, the extent 1-1, the extent 1-2, and the extent 1-3 are all described by using the extent 1. For the three storage devices, received write requests are all write requests for the extent 1. In this case, multiple write requests in the same first target data carry a same virtual storage address.

For each storage device corresponding to the extent 1, a slice included in the received 1st write request is a slice 1, and is the 1st slice written to the extent 1. Therefore, storage starts from a start address of the extent 1. If the slice 1 is written successfully in all the three storage devices, an end address of the successful continuous storage address range is an end address of the slice 1 in the three storage devices. Start addresses of the three successful continuous storage address ranges are the start address of the extent 1 as described above.

For each storage device corresponding to the extent 1, a slice included in the received 2nd write request is a slice 2. The slice 2 is successfully written to a storage device A and a storage device C of the extent 1, and extent 1 does not write successfully in a storage device B. In this case, in the storage device A and the storage device C, the end address of the successful continuous storage address range of the extent 1 (specifically, the extent 1-1 of the storage device A of the extent 1, and the extent 1-3 of the storage device C of the extent 1) is an end address of the slice 2. In the storage device B, the end address of the successful continuous storage address range of the extent 1 (specifically, the extent 1-2) is still the end address of slice 1.

For each storage device corresponding to the extent 1, a slice included in the received 3rd write request is a slice 3, and the slice 3 is written successfully to all the three storage devices of the extent 1. In this case, in the storage device A and the storage device C, the end address of the successful continuous storage address range of the extent 1 is an end address of the slice 3. In the storage device B, because the slice 2 is not recovered, a storage location of the slice 2 is reserved, thereby forming a "hole". Therefore, the end address of the successful continuous storage address range of the extent 1 is still the end address of the slice 1.

For each storage device corresponding to the extent 1, a slice included in the received 4th write request is a slice 4, and the slice 4 is written successfully to all the three storage devices of the extent 1. In addition, in this case, the slice 2 is successfully recovered in the storage device B, that is, the "hole" that previously existed in the storage device B is filled with the slice 2. Therefore, in the three storage devices, the end address of the successful continuous storage address range of the extent 1 is the end address of the slice 3.

The successful continuous storage address range is recorded in multiple manners. For example, in an indirect manner, an LBA range of each slice written to the target extent is recorded, and whether each slice is written successfully is recorded. Therefore, on this basis, a successful continuous storage LBA address range of the target extent can be deduced and a corresponding virtual storage address range can be learned. Alternatively, the virtual storage address range of the target extent within which storage is performed continuously successfully is directly recorded. The start address of the successful continuous storage address range is the start address of the extent. Therefore, if the slice is written successfully, and all slices before the slice are all written successfully in the extent, the successful continuous storage address range is updated to an end address of the slice. On the contrary, if the slice is not written successfully, or a slice not written successfully exists before the slice in the extent, the successful continuous storage address range is not updated.

The specific examples in step 201 and step 202 are still used. The first storage device corresponding to the port 32 converts extent 5+offset 100+slice length 50 into an LBA address range: LBA 40339215+slice length 50, and writes the slice to physical storage space corresponding to the LBA address range generated through conversion.

203. The first storage server sends a write success response of the first write request to the client server.

The write success response and the first write request carry a same write request ID. After receiving a write success response of the first storage device, the client server can learn that the first slice sent to the first storage device is successfully written, and in the first storage device, there is no hole between the start address of extent 1 and the end address of the first slice. The client server may record that write to a first storage location is successful, and record the first storage location in metadata of the first target data.

There is more than one write request. Therefore, in addition to the response message of the first write request, the client server may further receive a response message of another write request. If a quantity of write success responses received by the client server reaches a preset quantity, and a storage device corresponding to the write success response does not have a slice not written successfully, the first target data is stored successfully in the distributed storage system. In the multi-copy storage manner, 1≤a value of a preset quantity≤a total quantity of copies. In the EC storage manner, N≤a value of a preset quantity≤N+M.

Optionally, a storage device that does not write successfully (slow node) may obtain the slice from a storage device that writes successfully and store the slice, and send a write success response after storing the slice successfully. Such storage device is referred to as a slow storage device because storage of the slice is delayed.

In the multi-copy storage manner, the storage device that does not write successfully may directly obtain a needed slice from another storage device. In the EC storage manner, the storage device that does not write successfully may obtain a needed slice after obtaining at least N slices and performing EC parity.

The examples in steps 201, 202, and 203 are still used. Assuming that a preset threshold is 2, the client server receives two success responses, and extents to which the two copies are successfully written both successfully perform storage continuously. It may be considered that the slice in the first target data is stored successfully in the distributed storage system. The client server may record extent 5+offset 100+slice length 50 to which write is performed in the distributed storage system.

The foregoing describes a data write procedure, and the following describes a data read procedure. A data read granularity is not related to a data write granularity, and may be greater than, equal to, or less than a length of a slice.

In some approaches, in the multi-copy storage manner, usually, only when all copies are successfully stored, it may be considered that storage is successful in the distributed storage system, and a slow storage device is not allowed. In comparison, in this embodiment, a storage failure of a storage device is allowed. This improves tolerance of a slow storage device, and improves overall copy storage efficiency.

The following describes a read procedure. Data that the client server needs to read is second target data. The read procedure and the write procedure may be independent from each other, and do not need to be performed in a particular time sequence.

204. The client server sends a read request to the storage server, where the read request carries a storage device address, and a virtual storage address segment of data that needs to be read.

In the multi-copy storage manner, there may be only one read request.

In the EC storage manner, a quantity of read requests depends on a quantity of storage devices on which the second target data is distributed. For example, the first target data is 30 bytes, and is written to five storage devices in the distributed storage system in a manner of 3+2 (three data slices+two parity slices), and a length of each slice is 10 bytes. A first data slice includes the first byte to the tenth byte of the first target data, a second data slice includes the eleventh byte to the twentieth byte of the first target data, and a third data slice includes the twenty-first byte to the thirtieth byte of the first target data. If the second target data that the client server needs to read is the eleventh byte to the twentieth byte, the client server sends a read request to a storage device on which the second data slice is located, and a requested data length is ten bytes. If the second target data that the client server needs to read is the twenty-sixth byte to the thirtieth byte, the client server sends a read request to a storage device on which the third data slice is located, and a length of data requested to be read is five bytes. If the second target data that the client server needs to read is the first byte to the twenty-fifth byte, the client server sends three read requests separately, destinations of the three read requests are storage devices on which the three data slices are located respectively, and lengths of data that the three read requests request to read are 10 bytes, 10 bytes, and 5 bytes respectively. Certainly, alternatively, the three slices may be randomly read, the first target data is obtained again by using an EC parity algorithm, and then the second target data is obtained from the first target data.

In the multi-copy storage manner and the EC storage manner, a storage device processes a read request in a similar manner. Therefore, for ease of description, the following still uses one read request thereof as an example for description. The read request is referred to as a first read request. The operation of sending, by a client, a read request to a corresponding storage server includes sending the first read request to the first storage server corresponding to the first read request.

Data in the first read request includes a first device address and a first virtual storage address segment. The first virtual storage address segment includes: extent ID+start address+length, or extent ID+start address+end address. The first virtual storage address segment indicates a location at which data that the read request needs to read is located in the first virtual storage block.

A manner of obtaining, by the client server, each information in the first read request is briefly described as follows: Metadata of the second target data may be obtained by using an ID of the second target data (an ID of the second target data is, for example, a file name of the second target data or a hash value of the second target data), and a virtual storage address range corresponding to the second target data may be learned by using the metadata of the second target data. The virtual storage address range includes an extent ID, the extent ID corresponds to a partition, and there is a correspondence between a partition and a storage device. Therefore, the client server can learn, by using the ID of the second target data, a storage device on which to-be-read data is located. The storage device belongs to the storage server. Therefore, after obtaining the storage device on which the to-be-read data is located, the storage server on which the to-be-read data is located is obtained.

The example in step 201 is still used. A device address of the first read request is: IP address 211.133.44.13+port 32, and the first virtual storage address segment is: extent 5+start address 100+data length 30. A server address to which the first read request is to be sent is 211.133.44.13, and a storage device to which the first read request is to be sent is a storage device corresponding to the port 32. A storage location of the storage server that is indicated by the first read request is: in the extent 5, data having a length of 30 is read from a start address having an offset 100.

205. After receiving the first read request, the first storage server determines whether a successful continuous storage address range of a first extent includes a first virtual storage address segment; and if a determining result is yes, reads data in the first virtual storage address segment from the first storage device. As described above, the information of "successful continuous storage address range" may be stored in the first storage device.

If the determining result is yes, the first storage server reads data from a second virtual storage address of the first storage device, and returns the data to the client server.

If the determining result is no, it indicates that the successful continuous storage address range of the first extent of the first storage device does not store data that needs to be read. Therefore, a failure response message may be fed back to the client server. In the multi-copy storage manner, because data stored by multiple storage devices is the same, after receiving the failure response message, the client server may generate a read request again and send the read request to a next storage server (a second storage server), and try to obtain data of the first virtual storage address segment from the next storage server. The next storage server continues to perform similar determining, until a storage device whose successful continuous storage address range of the first extent includes the second virtual storage address is found, and reads data from the storage device and return the data to the client server.

FIG. 3 is used as an example. Before the storage device A receives a fourth read request, the client server determines whether the storage device A stores a slice 2. In the storage device A, an end of the successful continuous storage address range of extent 1 is the end address of the slice 3, and the successful continuous storage address range of the first extent includes a virtual storage address of the slice 2. Therefore, a determining result is "yes". Before the storage device B receives the fourth read request, whether the storage device B stores the slice 2 is determined. In the storage device B, an end of the successful continuous storage address range of the extent 1 is the end address of the slice 1. Therefore, the successful continuous storage address range of the first extent does not include the virtual storage address of the slice 2, and a determining result is "no".

206. The client server obtains the second target data.

In the multi-copy storage manner, the second target data may be directly obtained from a response message of the first read request.

In the EC storage manner, if the client server sends only one read request in step 204, the second target data may be directly obtained from the response message of the first read request. If the client server sends at least two read requests in step 204, slices obtained from response messages of the multiple read requests are combined to form the second target data.

In steps 204 to 206, how to obtain the second target data from the first storage device of the distributed storage system is described. In another case, the first storage device cannot provide data requested by the client server. Therefore, the client server sends a read request to a next storage server (specifically, a storage device of the storage server), continues to try to read the data requested by the client server, and if the data is not read successfully, continues to send a read request to a next storage server (specifically, a storage device of the storage server), and this process is cyclically performed, until the data requested by the client server is read. In this case, the data requested by the client server is not read once. Therefore, data read efficiency is low. However, this case is very rare, and in most cases, the data requested by the client server may be obtained by reading once as in 204 to 206. This is because, from the perspective of statistics, overall read efficiency is higher than that in other approaches. Because a data read principle is the same as that described in steps 204 to 206, and a difference is only that there are several more read data trials, this case is not described in detail, and a simple description is as follows:

The first storage server receives a second read request. For content carried in the second read request, refer to the first read request, for example, a second virtual storage address segment and the ID of the first storage device are carried. A difference from step 205 is that the first storage server detects that the second virtual storage address segment does not fall within a first successful continuous storage address range. Therefore, the first storage server sends a failure response message to the client server.

After receiving the failure response message, the client server sends a third read request to a second storage server in the distributed storage system. For content carried in the third read request, refer to the first read request. For example, the third read request carries the second virtual storage address segment and an ID of a second storage device. It should be noted that the second storage device is different from the first storage device, and the first storage device and the second storage device correspond to the first virtual storage block.

When the second virtual storage address segment falls within a second successful continuous storage address range of the second storage server, the second storage server reads the data of the second virtual storage address segment from the second storage device and returns the data to the client server. For a process of reading the data from the second storage device, refer to step 205. The second successful continuous storage address range indicates that within a virtual storage address range of the first virtual storage block in the second storage device, slices are continuously stored from the start address of the first virtual storage block to the end address of the first slice.

The disclosure further provides an implementation of a storage medium, where the storage medium records program code. A storage server may perform the foregoing method by executing the program code.

The disclosure further provides a computer program. A storage server may perform the foregoing method by executing the computer program.

The following describes a storage apparatus. The storage apparatus may include software modules running on a storage server. The software modules jointly perform the operations performed by the storage server in steps 202 to 205. The storage apparatus may alternatively be hardware, and is, for example, a hardware apparatus including a processor, a memory, and a storage device. The processor runs a program in the memory to perform the operations performed by the storage server in steps 202 to 205.

Figure 4:
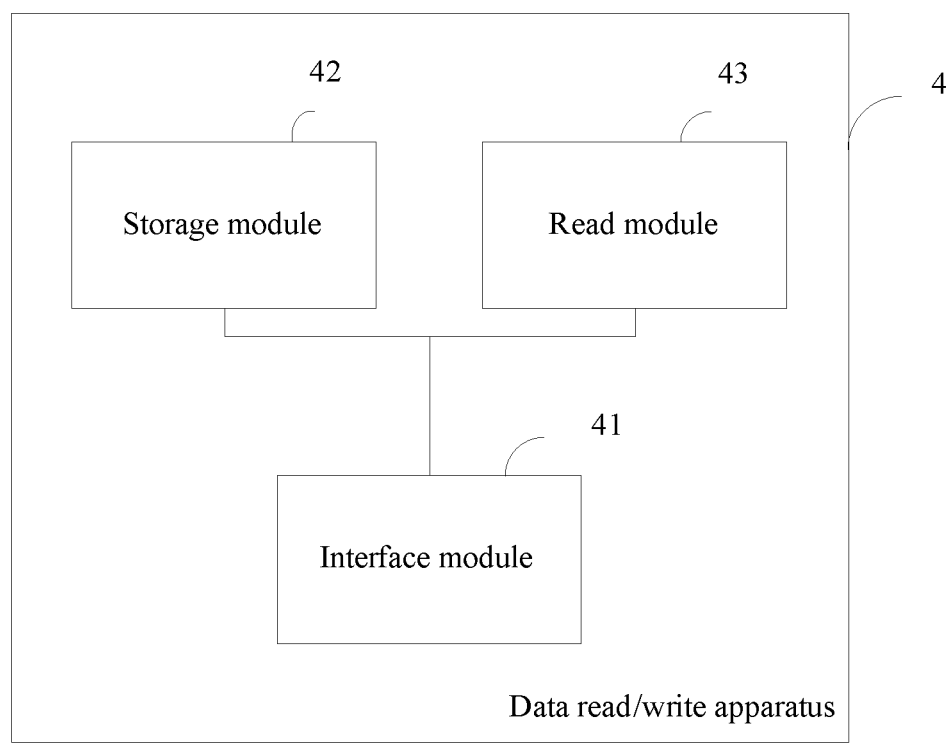
FIG. 4 is a structural functional diagram of an embodiment of a data storage apparatus according to the disclosure.

As shown in FIG. 4, a data storage apparatus 4 is applied to a first storage server in a distributed storage system. The distributed storage system includes multiple storage servers, each storage server includes at least one storage device, each virtual storage block of the distributed storage system corresponds to multiple storage devices, and the data storage apparatus 4 includes an interface module 41, a storage module 42, and a read module 43.

The interface module 41 is configured to receive a write request and a read request. The write request includes a first slice of first target data, a first virtual storage address, and an ID of a first storage device, the first virtual storage address is a relative location in a first virtual storage block, the first virtual storage address corresponds to a first logical block address of the first storage device, the first storage device is one of storage devices corresponding to the first virtual storage block, and the first storage device is managed by the first storage server.

The storage module 42 is configured to store the first slice in the first storage device by using the first logical block address as a start address. After storage of the first slice is completed, when slices are continuously stored from a start address of the first virtual storage block to an end address of the first slice within a virtual storage address range of the first virtual storage block in the first storage device, a continuous address segment is recorded as a first successful continuous storage address range.

The interface module 41 is further configured to receive a read request. The read request carries a first virtual storage address segment, and a logical block address corresponding to the first virtual storage address segment is located at the first storage device.

The read module 43 is configured to: when the first virtual storage address segment falls within the first successful continuous storage address range, read data of the first virtual storage address segment from the first storage device.

According to the data read/write method and the data storage apparatus provided, a storage server receives a write request of a client and performs storage. Each write request carries a to-be-written slice, an ID of a first storage device, and a virtual storage address of a first virtual storage block. If storage is performed continuously successfully from a start address within virtual storage space of a virtual storage block in the storage device, a successful continuous storage address range is recorded. For each storage device, all data within the first successful continuous storage address range is successfully stored data. When receiving a read request of a client for an address segment within the address range, the storage server may directly return data that needs to be read to the client.

In a storage manner of not-in-place write, data may be read according to a virtual storage address segment. If the first successful continuous storage address range provided in the embodiments is used, it can be ensured that data that is read is correct. However, if the successful continuous storage address range provided in the embodiments is not used, data that is read may be correct or wrong. For example, data already deleted from the system actually can still be read, but obviously the data is not needed by a user. In other words, the data that is read is wrong. In this case, a version number needs to be used, and the client server determines whether a version number carried in the data that is read is the same as that of data that needs to be read by the client server. If the version numbers are the same, it indicates that the data that is read is correct. Otherwise, the data that is read is wrong.

What is claimed is:

1. A data processing method comprising:
dividing data into slices;
sending the slices to storage devices in corresponding storage servers for storing, wherein each of the storage servers comprises at least one of the storage devices, and wherein the storage devices comprise a first storage device; and
recording, in a virtual storage block, in response to stored slices being successfully stored in the first storage device, and in a direct manner, a successful continuous storage address range of the stored slices by:
updating the successful continuous storage address range to an end address of a slice when the slice is written successfully and when all previous slices before the slice in an extent are written successfully; and
not updating the successful continuous storage address range when the slice is not written successfully or when a previous slice before the slice in the extent is not written successfully,
wherein, within each of the storage devices comprising the stored slices, the stored slices are adjacent to each other.

2. The data processing method of claim 1, further comprising receiving a first read request comprising a first virtual address.

3. The data processing method of claim 2, further comprising determining whether the first virtual address falls within the successful continuous storage address range.

4. The data processing method of claim 3, further comprising reading corresponding data from the first virtual address when the first virtual address falls within the successful continuous storage address range.

5. The data processing method of claim 4, further comprising receiving a second read request comprising a second virtual address.

6. The data processing method of claim 5, further comprising:

determining whether the second virtual address falls within the successful continuous storage address range; and returning a failure response when the second virtual address does not fall within the successful continuous storage address range.

7. The data processing method of claim 1, wherein the slices belong to a stripe.

8. The data processing method of claim 1, wherein the slices are copies of the data.

9. The data processing method of claim 1, wherein the successful continuous storage address range is of a logical block or logical blocks.

10. A data processing apparatus comprising:
a processor configured to divide data into slices; and
an interface coupled to the processor and configured to send the slices to storage devices in corresponding storage servers for storing, wherein each of the storage servers comprises at least one of the storage devices, wherein the storage devices comprise a first storage device,
wherein the processor is further configured to record, in a virtual storage block, in response to stored slices being successfully stored in the first storage device, and in a direct manner, a successful continuous storage address range of the stored slices by:
updating the successful continuous storage address range to an end address of a slice when the slice is written successfully and when all previous slices before the slice in an extent are written successfully; and
not updating the successful continuous storage address range when the slice is not written successfully or when a previous slice before the slice in the extent is not written successfully, and
wherein, within each of the storage devices comprising the stored slices, the stored slices are adjacent to each other.

11. The data processing apparatus of claim 10, wherein the processor is further configured to receive a first read request comprising a first virtual address.

12. The data processing apparatus of claim 11, wherein the processor is further configured to determine whether the first virtual address falls within the successful continuous storage address range.

13. The data processing apparatus of claim 12, wherein the processor is further configured to read corresponding data from the first virtual address when the first virtual address falls within the successful continuous storage address range.

14. The data processing apparatus of claim 13, wherein the processor is further configured to:
receive a second read request comprising a second virtual address;
determine whether the second virtual address falls within the successful continuous storage address range; and
return a failure response when the second virtual address does not fall within the successful continuous storage address range.

15. The data processing apparatus of claim 10, wherein the slices belong to a stripe.

16. The data processing apparatus of claim 10, wherein the slices are copies of the data.

17. The data processing apparatus of claim 10, wherein the successful continuous storage address range is of a logical block or logical blocks.

18. A computer program product comprising instructions that are stored on a non-transitory medium and that, when executed by a processor, cause a data processing apparatus to:
divide data into slices;
send the slices to storage devices in corresponding storage servers for storing, wherein each of the storage servers comprises at least one of the storage devices, and wherein the storage devices comprise a first storage device; and
record, in a virtual storage block, in response to stored slices being successfully stored in the first storage device, and in a direct manner, a successful continuous storage address range of the stored slices by:
updating the successful continuous storage address range to an end address of a slice when the slice is written successfully and when all previous slices before the slice in an extent are written successfully; and
not updating the successful continuous storage address range when the slice is not written successfully or when a previous slice before the slice in the extent is not written successfully,
wherein, within each of the storage devices comprising the stored slices, the stored slices are adjacent to each other.

19. The computer program product of claim 18, wherein the instructions further cause the data processing apparatus to:
receive a first read request comprising a first virtual address;
determine whether the first virtual address falls within the successful continuous storage address range; and
read corresponding data from the first virtual address when the first virtual address falls within the successful continuous storage address range.

20. The computer program product of claim 19, wherein the instructions further cause the data processing apparatus to:
receive a second read request comprising a second virtual address;
determine whether the second virtual address falls within the successful continuous storage address range; and
return a failure response when the second virtual address does not fall within the successful continuous storage address range.

21. The computer program product of claim 18, wherein the slices belong to a stripe.

22. The computer program product of claim 18, wherein the slices are copies of the data.

23. The data processing method of claim 1, wherein continuous means that an end address of one of the stored slices is adjacent to a start address of next one of the stored slices so that there is no hole between the stored slices.

24. The computer program product of claim 18, wherein the successful continuous storage address range is of a logical block or logical blocks.

* * * * *

UNITED STATES PATENT AND TRADEMARK OFFICE
CERTIFICATE OF CORRECTION

PATENT NO. : 11,397,668 B2                                                                                        Page 1 of 1
APPLICATION NO. : 16/856257
DATED : July 26, 2022
INVENTOR(S) : Yao et al.

It is certified that error appears in the above-identified patent and that said Letters Patent is hereby corrected as shown below:

On the Title Page

Item (30) Foreign Application Priority Data: should read "Oct. 25, 2017 (WO) PCT/CN2017/107695"

Signed and Sealed this
Twenty-seventh Day of September, 2022

Katherine Kelly Vidal
*Director of the United States Patent and Trademark Office*